(12) United States Patent
Ray et al.

(10) Patent No.: US 6,349,174 B1
(45) Date of Patent: Feb. 19, 2002

(54) METHOD AND APPARATUS FOR A COLOR SCANNERLESS RANGE IMAGING SYSTEM

(75) Inventors: Lawrence A. Ray; Louis R. Gabello, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/572,522

(22) Filed: May 17, 2000

(51) Int. Cl.$^7$ .............................. G03B 13/36; G01C 3/08
(52) U.S. Cl. ......................................... 396/106; 356/5.1
(58) Field of Search .................... 396/106, 89; 356/5.1, 356/5.11, 5.12, 5.13, 5.14, 5.15

(56) References Cited

U.S. PATENT DOCUMENTS 6,288,776 B1 * 9/2001 Cahill et al. .................. 356/5.1

* cited by examiner

*Primary Examiner*—W. B. Perkey
(74) *Attorney, Agent, or Firm*—David M. Woods

(57) ABSTRACT

A color scannerless range imaging system includes an illumination system for controllably illuminating a scene with modulated illumination and an image responsive element for capturing image light from the scene, including the modulated image light. The system establishes a primary optical path for directly image light toward the image responsive element. A beamsplitter located in the primary optical path separates the image light into two channels, a first channel including an infrared component and a second channel including a color texture component, whereby one of the channels traverses a secondary optical path distinct from the primary path. A modulating element is operative in the first channel to receive the infrared component and a modulating signal, and to generate a processed infrared component with phase data indicative of range information. An optical network is provided in the secondary optical path for recombining the secondary optical path into the primary optical path such that the processed infrared component and the color texture component are directly to the image responsive element.

29 Claims, 6 Drawing Sheets

METHOD AND APPARATUS FOR A COLOR SCANNERLESS RANGE IMAGING SYSTEM

FIELD OF THE INVENTION

The present invention is in the field of three-dimensional image capture and in particular to the capture of three-dimensional image information with a scannerless range imaging system.

BACKGROUND OF THE INVENTION

Standard image capture systems will capture images, such as photographic images, that are two-dimensional representations of the three-dimensional world. In such systems, projective geometry best models the process of transforming the three-dimensional real world into the two-dimensional images. In particular, much of the information that is lost in the transformation is in the distance between the camera and image points in the real world. Methods and processes have been proposed to retrieve or record this information. Some methods, such as one based on a scanner from Cyberware, Inc., use a laser to scan across a scene. Variations in the reflected light are used to estimate the range to the object. However, these methods require the subject to be close (e.g., within 2 meters) to the camera and are typically slow. Stereo imaging is a common example of another process, which is fast on capture but requires solving the "correspondence problem", that is, the problem of finding corresponding points in the two images. This can be difficult and limit the number of pixels having range data, due to a limited number of feature points that are suitable for the correspondence processing.

Another method described in U.S. Pat. No. 4,935,616 (and further described in the Sandia Lab News, vol. 46, No. 19, Sep. 16, 1994) provides a scannerless range imaging system using either an amplitude-modulated high-power laser diode or an array of amplitude-modulated light emitting diodes (LEDs) to completely illuminate a target scene. Conventional optics confine the target beam and image the target onto a receiver, which includes an integrating detector array sensor having hundreds of elements in each dimension. The range to a target is determined by measuring the phase shift of the reflected light from the target relative to the amplitude-modulated carrier phase of the transmitted light. To make this measurement, the gain of an image intensifier (in particular, a micro-channel plate) within the receiver is modulated at the same frequency as the transmitter, so the amount of light reaching the sensor (a charge-coupled device) is a function of the range-dependent phase difference. A second image is then taken without receiver or transmitter modulation and is used to eliminate non-range-carrying intensity information. Both captured images are registered spatially, and a digital processor is used to operate on these two frames to extract range. Consequently, the range associated with each pixel is essentially measured simultaneously across the whole scene.

The preferred method of estimating the range in the '616 patent uses a pair of captured images to be captured, one image with a destructive interference caused by modulating the image intensifier, and the other with the image intensifier set at a constant voltage. However, a more stable estimation method uses a series of at least three images, each with modulation applied to the image intensifier as described in commonly assigned copending application Ser. No. 09/342,370, entitled "Method and Apparatus for Scannerless Range Image Capture Using Photographic Film" and filed Jun. 29, 1999 in the names of Lawrence Allen Ray and Timothy P. Mathers. In that application, the distinguishing feature of each image is that the phase of the image intensifier modulation is unique relative to modulation of the illuminator. If a series of n images are to be collected, then the preferred arrangement is for successive images to have a phase shift of $$\frac{2\pi}{n}$$

radians (where n is the number of images) from the phase of the previous image. However, this specific shift is not required, albeit the phase shifts need to be unique. The resultant set of images is referred to as an image bundle. The range at a pixel location is estimated by selecting the intensity of the pixel at that location in each image of the bundle and performing a best fit of a sine wave of one period through the points. The phase of the resulting best-fitted sine wave is then used to estimate the range to the object based upon the wave-length of the illumination frequency.

A drawback of methods using an image intensifier is that color information is lost. Unfortunately for color applications, an image intensifier operates by converting photonic energy into a stream of electrons, amplifying the energy of the electrons and then converting the electrons back into photonic energy via a phosphor plate. One consequence of this process is that color information is lost. Since color is a useful property of images for many applications, a means of acquiring the color information that is registered along with the range information is extremely desirable.

One approach to acquiring color is to place a dichromatic mirror in the optical path before the micro-channel-plate. Following the mirror a separate image capture plane (i.e., a separate image sensor) is provided for the range portion of the camera and another image capture plane (another sensor) is provided for the color texture capture portion of the camera. This is the approach taken by 3DV Technology with their Z-Cam product. Besides the added expense of two image capture devices, there are additional drawbacks in the need to register the two image planes precisely, together with alignment of the optical paths. Another difficulty is collating image pairs gathered by different sources.

Recognizing that the system described in the '616 patent may be implemented in relation to a normal camera system, and, in particular, that a standard camera system may be converted into a range capture system by modifying its optical system, another approach is to capture an image bundle having interchangeable optical assemblies: one optical assembly for the phase image portion and a separate optical element for the color texture image portion. This approach is described in detail in commonly assigned copending application Ser. No. 09/451,823, entitled "Method and Apparatus for a Color Scannerless Range Image System" and filed Nov. 30, 1999 in the names of Lawrence Allen Ray, Louis R. Gabello and Kenneth J. Repich. The drawback of this approach is the need to switch lenses and the possible misregistration that might occur due to the physical exchange of lens elements. There is an additional drawback in the time required to swap the two optical assemblies, and the effect that may have on the spatial coincidence of the images.

A scannerless range imaging camera may operate either as a digital camera or a camera utilizing film. In the case of a film based system there are some other requirements that need to be met. These requirements and means for satisfying them are described in the aforementioned copending application Ser. No. 09/342,370. As mentioned above, the drawback of such a camera system, including a film-based system, is its inability to capture a color image.

What is needed is a convenient camera system that would avoid the aforementioned limitations and capture ranging information without sacrificing color information that would otherwise be available for capture.

SUMMARY OF THE INVENTION

It is an object of the invention to provide a scannerless range imaging system that is capable of capturing both range images and color images of a scene.

The present invention is directed to overcoming one or more of the problems set forth above. Briefly summarized, according to one aspect of the present invention, a color scannerless range imaging system includes an illumination for controllably illuminating a scene with modulated illumination and an image responsive element for capturing image light from the scene, including the modulated image light. The system establishes a primary optical path for directing image light toward the image responsive element. A beamsplitter located in the primary optical path separates the image light into two channels, a first channel including an infrared component and a second channel including a color texture component, whereby one of the channels traverses a secondary optical path distinct from the primary path. A modulating element is operative in the first channel to receive the infrared component and a modulating signal, and to generate a processed infrared component with phase data indicative of range information. An optical network is provided in the secondary optical path for recombining the secondary optical path into the primary optical path such that the processed infrared component and the color texture component are directed to the image responsive element.

The current invention eliminates the requirement for two image capture planes, but allows the operator to collect a full range map with texture with a single exposure activation. In particular, the invention employs a dichromatic mirror to separate a channel for capturing range data and a channel for capturing color texture data, while only using a single image capture subsystem. The advantage of the present invention is that is provides a means of obtaining a color image along with range information for each point on the image. Besides using a scannerless range image capture method, which is rapid and operative over a longer range than other methods, the invention includes a single optical assembly and a dual illuminating system so that both range and color information may be efficiently captured under the best illuminating conditions for each capture. The ability to accomplish this is provided in part by having the range capture system embodied as a camera attachment that is optically coupled with the image capture device.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because range imaging devices employing laser illuminators and capture devices including image intensifiers and electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

Figure 8:
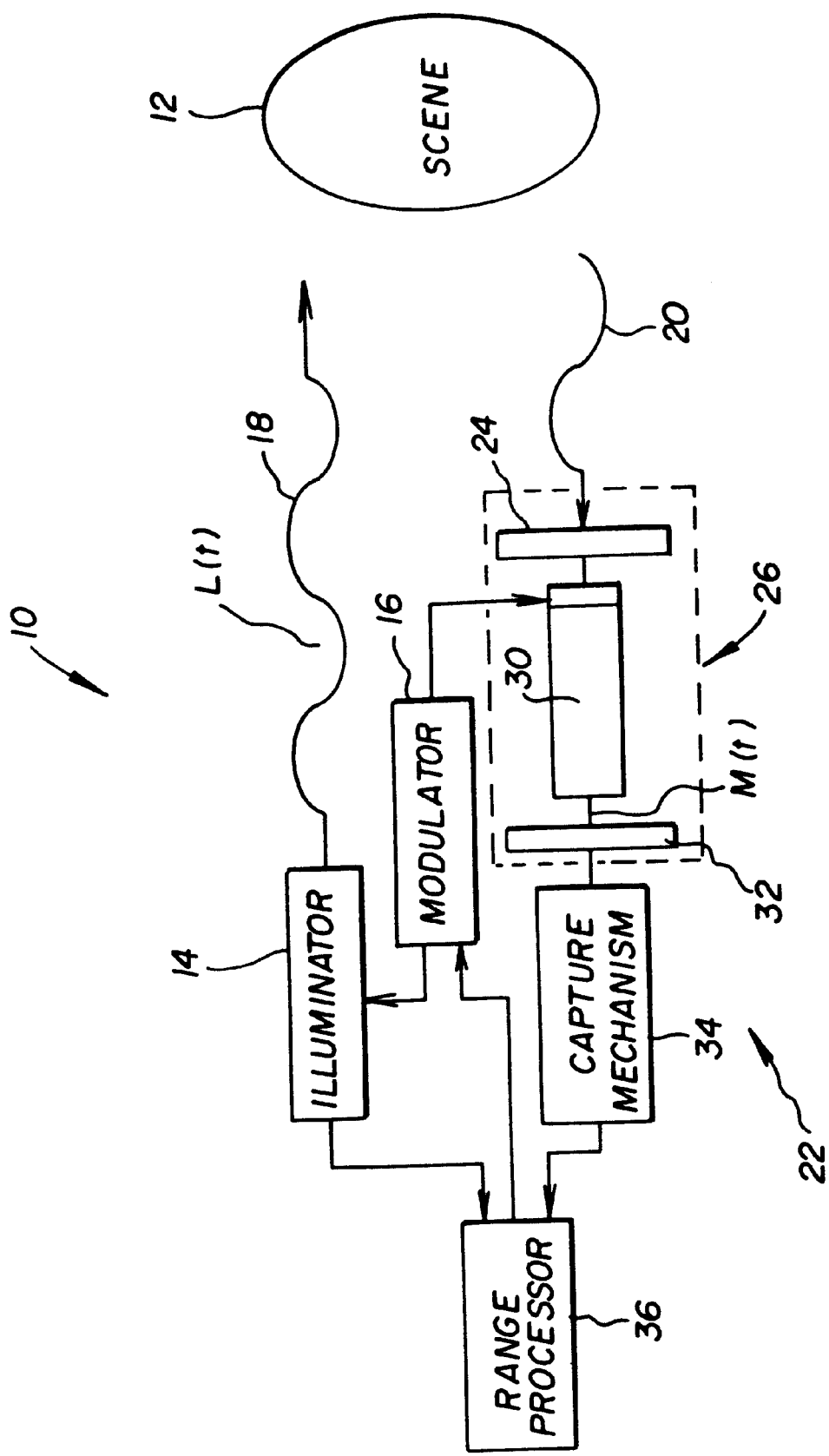
FIG. 8 is a block diagram of a range imaging system which can be used to capture a bundle of images.

It is helpful to first review the principles and techniques involved in scannerless range imaging, particularly in connection with the capture of image bundles in accordance with the aforementioned copending applications Ser. No. 09/342,370, entitled "Method and Apparatus for Scannerless Range Image Capture Using Photographic Film". Accordingly, referring first to FIG. 8, a range imaging system 10 is shown as a laser radar that is used to illuminate a scene 12 and then to capture an image bundle comprising a minimum of three images of the scene 12. An illuminator 14 emits a beam of electromagnetic 20 radiation whose frequency is controlled by a modulator 16. Typically the illuminator 14 is a laser device which includes an optical diffuser in order to effect a wide-field illumination. It is preferable that the modulating laser is an IR source. This is for eye-safety issues and to operate in the spectral region of maximal response by the capture system. The modulator 16 provides an amplitude varying sinusoidal modulation. The modulated illumination source is modeled by:

$$L(t)=\mu_L+\eta \sin(2\pi\lambda t) \qquad \text{(Eq. 1)}$$

where $\mu_L$ is the mean illumination, $\eta$ is the modulus of the illumination source, and $\lambda$ is the modulation frequency applied to the illuminator 14. The modulation frequency is sufficiently high (e.g., 10 MHz) to attain sufficiently accurate range estimates. The output beam 18 is directly toward the scene 12 and a reflected beam 20 is directly back toward a receiving section 22. As is well known, the reflected beam 20 is a delayed version of the transmitted output beam 18, with the amount of phase delay being a function of the distance of the scene 12 from the range imaging system. The reflected beam 20 strikes the photocathode 24 within the image intensifier 26 producing a modulated electron stream proportional to the input amplitude variations. Since the photocathode 24 does not separately process the colors in the scene, the electron stream created at this point is essentially monochromatic, i.e., the color information is lost at this time. The output of the image intensifier 26 is modeled by:

$$M(t) = \mu_M + \gamma \sin(2\pi\lambda t) \quad \text{(Eq. 2)}$$

where $\mu_M$ is the mean intensification, $\gamma$ is the modulus of the intensification and $\lambda$ is the modulation frequency applied to the intensifier 26. The purpose of the image intensifier is not only to intensify the image, but also to act as a modulating shutter. Accordingly, the image intensifier 26 is connected to the modulator 16, such that the electron stream strikes the intensifier 26 and is modulated by a modulating signal from the modulator 16. The modulated electron stream is then amplified through secondary emission by a microchannel plate 30. The intensified electron stream bombards a phosphor screen 32, which converts the energy into a visible light image. The intensified light image signal is captured by a capture mechanism 34, such as a charge-coupled device (CCD). The captured image signal is applied to a range processor 36 to determine the phase delay at each point in the scene. The phase delay term $\omega$ of an object at a range $\rho$ meters is given by:

$$\omega = \frac{2\rho\lambda}{c} \mod 2\pi \quad \text{(Eq. 3)}$$

where c is the velocity of light in a vacuum. Consequently, the reflected light at this point is modeled by:

$$R(t) = \mu_L + \kappa \sin(2\pi\lambda t + \omega) \quad \text{(Eq. 4)}$$

where $\kappa$ is the modulus of illumination reflected from the object. The pixel response P at this point is an integration of the reflected light and the effect of the intensification:

$$P = \int_0^{2\pi} R(t)M(t)\,dt = 2\mu_L\mu_M + \kappa\pi\gamma\cos(\omega) \quad \text{(Eq. 5)}$$

In the range imaging system disclosed in the aforementioned '616 patent, a reference image is captured during which time the micro-channel plate is not modulated, but rather kept at a mean response. In that case, equation (5) fundamentally is unchanged, though M(t) is now simply a constant $\mu_M$. The range is estimated for each pixel by recovering the phase term as a function of the value of the pixel in the reference image and the phase image. There are several reasons why this approach is not robust. Included in this is the fact that the analysis depends upon continuous values. The range estimation is based upon the portion of the phase image relative tot he reference image. For digital systems the relative quantization of the phase image to the reference image decreases as the response to the reference image decreases. The system is also somewhat noise sensitive.

A robust approach which overcomes the limitations of the method proposed in the '616 patent is described in the aforementioned Ser. No. 09/342,370, which is incorporated herein by reference. Instead of collecting a phase image and a reference image, the improved approach collects at least three phase images (referred to as an image bundle). In the previous approach, the intensifier 26 and the laser illuminator 14 were phase locked. The improved approach shifts the phase of the intensifier 26 relative to the phase of the illuminator 14, and each of the phase images has a distinct phase offset. For this purpose, the range processor 36 is suitably connected to control the phase offset of the modulator 16, as well as the average illumination level and such other capture functions as may be necessary. If the image intensifier 26 (or laser illuminator 14) is phase shifted by $\theta_i$, the pixel response from equation (5) becomes:

$$P_i = 2\mu_L\mu_M\pi + \kappa\pi\gamma \cos(\omega + \theta_i) \quad \text{(Eq. 6)}$$

It is desired to extract the phase term $\omega$ from the expression. However, this term is not directly accessible from a single image. In equation (6) there are three unknown values and the form of the equation is quite simple. As a result, mathematically only three samples (from three images) are required to retrieve an estimate of the phase term, which is equivalent to the distance of an object in the scene from the imaging system 10. Therefore, a set of three images captured with unique phase shifts is sufficient to determine $\omega$. For simplicity, the phase shifts are given by $\theta_k = 2\pi k/3; k=0,1,2$. In the following description, an image bundle shall be understood to constitute a collection of images which are of the same scene, but with each image having a distinct phase offset obtained from the modulation applied to the intensifier 26. It should also be understood that an analogous analysis can be performed by phase shifting the illuminator 14 instead of the intensifier 26. If an image bundle comprising more than three images is captured, then the estimates of range can be enhanced by a least squares analysis using a singular value decomposition (see, e.g., W. H. Press, B. P. Flannery, S. A. Teukolsky and W. T. Vetterling, *Numerical Recipes (the Art of Scientific Computing)*, Cambridge University Press, Cambridge, 1986).

If images are captured with $n \geq 3$ distinct phase offsets of the intensifier (or laser or a combination of both) these images form an image bundle. Applying Equation (6) to each image in the image bundle and expanding the cosine term (i.e., $P_i = 2\mu_L\mu_M\pi + \kappa\pi\gamma(\cos(\omega)(\cos(\theta_i) - \sin(\omega)\sin(\theta_i)))$ results in the following system of linear equations in n unknowns at each point:

$$\begin{pmatrix} P_1 \\ P_2 \\ \vdots \\ P_n \end{pmatrix} = \begin{pmatrix} 1 & \cos\theta_1 & -\sin\theta_1 \\ 1 & \cos\theta_2 & -\sin\theta_2 \\ \vdots & \vdots & \vdots \\ 1 & \cos\theta_n & -\sin\theta_n \end{pmatrix} \begin{pmatrix} \Lambda_1 \\ \Lambda_2 \\ \Lambda_3 \end{pmatrix} \quad \text{(Eq. 7)}$$

where $\Lambda = 2\mu_L\mu_M\pi$, $\Lambda_2 = \kappa\pi\gamma \cos \omega$, and $\Lambda_3 = \kappa\pi\gamma \sin \omega$. This system of equations is solved by a singular value decomposition to yield the vector $\Lambda = [\Lambda_1, \Lambda_2, \Lambda_3]^T$. Since this calculation is carried out at every (x,y) location in the image bundle, $\Lambda$ is really a vector image containing a three element vector at every point. The phase term $\omega$ is computed at each point using a four-quadrant arctangent calculations:

$$\omega = \tan^{-1}(\Lambda_3, \Lambda_2) \quad \text{(Eq. 8)}$$

The resulting collection of phase values at each point forms the phase image. Once phase has been determined, range r can be calculated by:

$$r = \omega \frac{c}{4\pi\lambda} \quad \text{(Eq. 9)}$$

Equations (1)–(9) thus describe a method of estimating range using an image bundle with at least three images (i.e., n=3) corresponding to distinct phase offsets of the intensifier and/or laser.

Figure 1:
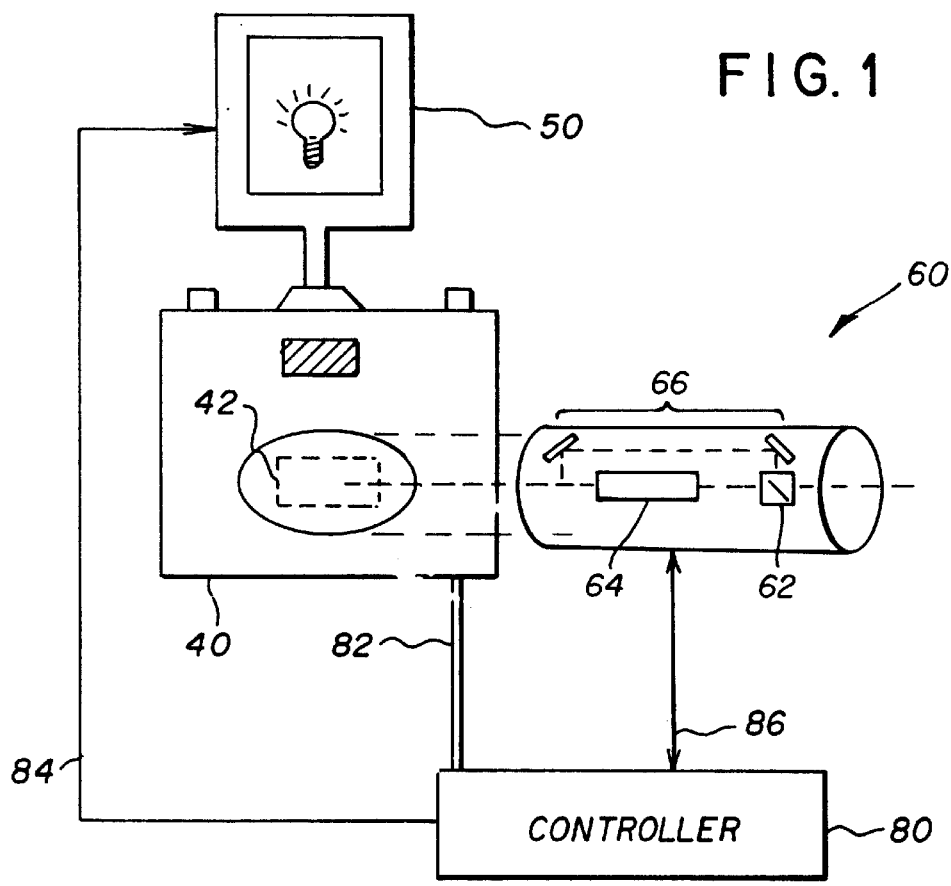
FIG. 1 shows the main components of a color scannerless range imaging system in accordance with the invention.

Referring now to FIG. 1, the overall color scannerless range imaging system is shown to comprise four main components in accordance with the present invention. The first component is a an image capture device 40 for capturing an image. This may be, for example, a camera body where an image capture element 42 might be either a photosensitive film or an electronic sensor, such as a charged-coupled-device. This device 40 is able to capture a plurality of images. Moreover, a remote trigger line 82 is provided for signaling the image capture device 40. Also, a means for advancing, or driving, the image capture device 40 to prepare for a successive image capture must be available. Such capabilities are well known in relation to such image capture devices, and will not be described in detail. The second component is an illumination system 50 for producing high-frequency amplitude modulated illumination of a desired average amplitude, amplitude modulus and frequency. It is also desirable that the illumination system 50 further includes the capability of shifting the phase of the amplitude modulation between a set of prescribed phase offsets (alternatively, this function may be performed by modulation of the reflected illumination in the capture portion of the color scannerless range imaging system). It is also useful for the illumination system 50 to have a preferred operating wavelength.

The third component is an optical assembly 60 comprised of a beam separator 62 for separating the incoming light into two channels, a first channel including an infrared component and a second channel including a color texture component, whereby one of the channels traverses a secondary optical path distinct from the primary path. The optical assembly 60 also includes a modulating element 64 operative in the first optical channel and an optical subassembly 66 for establishing the secondary optical path that bypasses the modulating element 64 and then rejoins the first optical channel. In the preferred embodiment, the first optical channel with the range information is directed straight through the optical assembly toward the image capture element 42 and the second optical channel with the color information bypasses the modulating element 62 via the optical subassembly 66 and then rejoins the first optical channel. Alternatively (but not shown), the second optical channel could be directly toward the image capture element 42 and the first optical channel with the modulating element 42 would then bypass the second channel via the optical subassembly 66 and then rejoin second optical channel. (The optical assembly is shown in FIG. 1 removed from a threaded lens mount on the image capture device 40; this is to emphasize that the image capture device 40 may be based on a conventional camera body that could otherwise be fitted with a standard family of lenses for conventional photography.)

The fourth component is a controller 80, which manages the overall image capture process of the image and range capture system, including the operation of the illumination system 50, the image capture device 40, and the optical assembly 60. For instance, the controller 80 may include the remote trigger line 82 for causing the image capture device 40 to initiate an image capture sequence, and an illumination control line 84 for causing the illumination system 50 to emit the correct illumination at the correct moment. It is preferred, but not mandatory, that the controller 80 automatically operates the component 60, via an optics control line 86, to engage the appropriate optical channel as needed for operation according to the invention.

Figure 2:
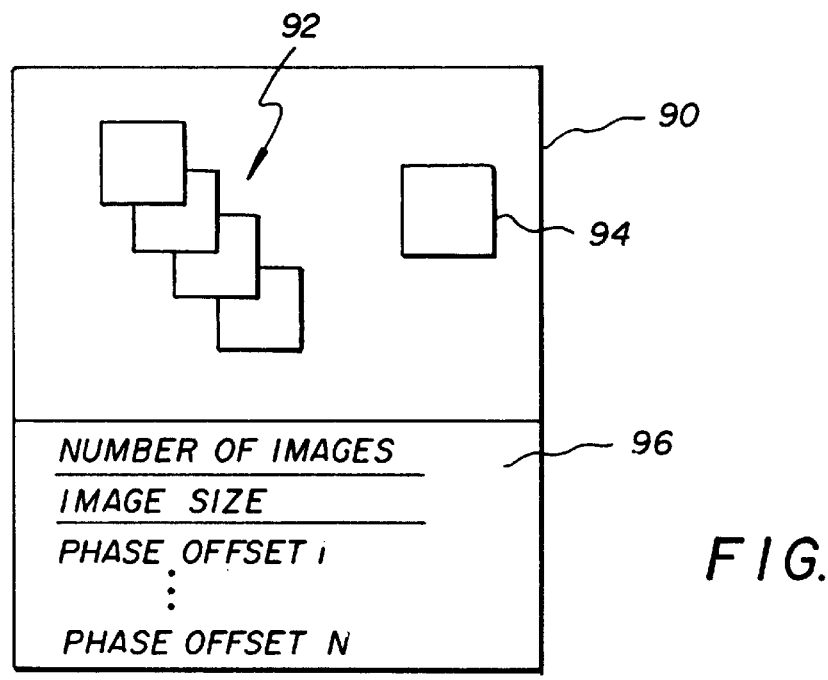
FIG. 2 is a diagram illustrating an image bundle and related data captured by the system shown in FIG. 1.

As shown in relation to FIG. 2, the notion of an image bundle 90 is central to the range estimation method. The image bundle 90 includes a combination of images captured by the system as well as information pertinent to the individual images and information common to all the images. The image bundle contains two types of images: range images 92 related to the image capture portion of the process and a color image 94, commonly referred to as the texture image. Common information 96 in the image bundle 90 would typically include the number of images in the bundle (three or more) and the modulation frequency utilized by the camera system. Other information might be the number of horizontal and vertical pixels in the images, and/or data related to camera status at the time of the image capture. Image specific information will include the phase offset 1 . . . N used for each (1 . . . N) of the individual range images 92. The image bundle 90 includes a minimum of three such images, each of which are monochrome. Each of the range images 92 records the effect of a distinct phase offset applied to either the illumination system 50 or to elements of the optical assembly 60. The additional color image 94 is an image using the optical channel that does not contain range capture components. Although this is a color image, it is preferably, but not necessarily, the same size as the range images 92.

Figure 3:
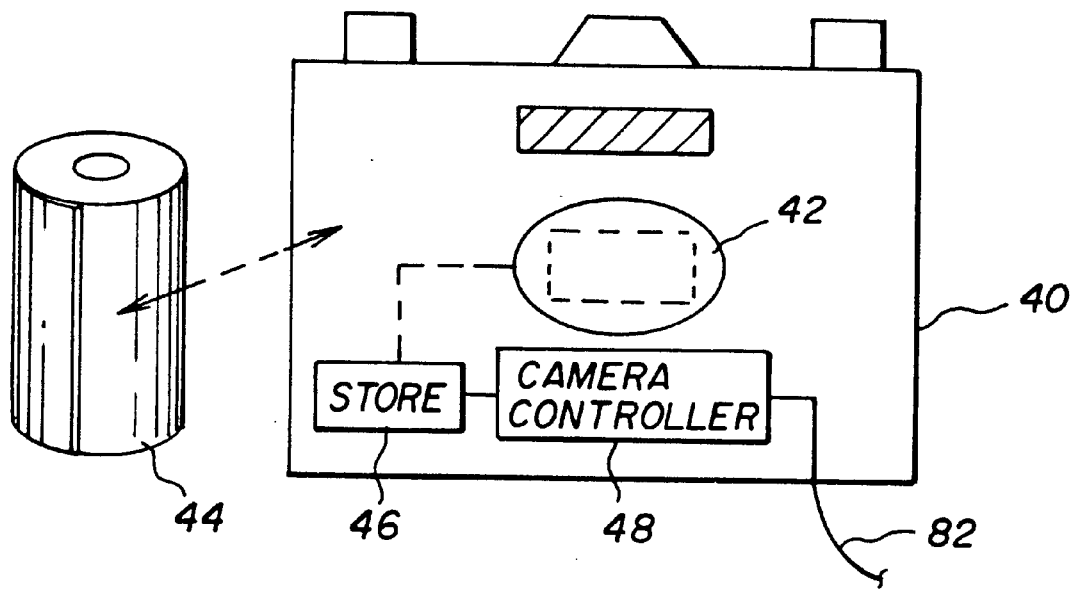
FIG. 3 is a diagram showing more detail of an image capture device as generally shown in FIG. 1.

The image capture device 40 shown in FIG. 3 shares many aspects of a standard camera body—except that, in this embodiment, image capture is initiated from the controller 80. (It should also be apparent that the controller 80 could be part of, or attached to, the camera body, and the electrical linkages 82 and 86 could be made directly through the camera body, e.g., the linkage 86 could be made by contracts in the lens mount of the camera body to the optical assembly 60). For the purpose of the present invention, the image capture element 42 is enabled to capture color images. In the case of a digital image capture device, the capture element 42 (e.g., a charge-coupled device) is covered with a color-filter-array (not shown) for generating a color image, and in the case of a film image capture system a color film is used and a method of introducing fiducial markings on the film is preferred for registration. Further details of a film capture system are shown in copending Ser. No. 09/342,370.

The image capture system requires image storage means to store all range images 92 in the image bundle 50, as well as a color texture image 94 in addition to the range images 92. This can be accomplished by an on-camera storage means, such as a photosensitive film 44 with multiple frames or a digital storage mechanism 46, such as an internal memory together output connections to, e.g., a PCMCIA card or a floppy disk (not shown) for receiving images from the internal memory. A camera controller 48 connected to the remote trigger line 82 accepts trigger signals and causes the image capture device 40 to capture an image. Once an image is recorded the image capture device 40 must automatically prepare for an additional image capture. In the case of a film based image capture system, an automatic film advance (not shown) is activated by the camera controller 48. In the case of a digital camera, the camera controller 48 stores the image bundle data onto the digital storage mechanism 46 and clears internal buffers (not shown) for a subsequent image capture.

Figure 4:
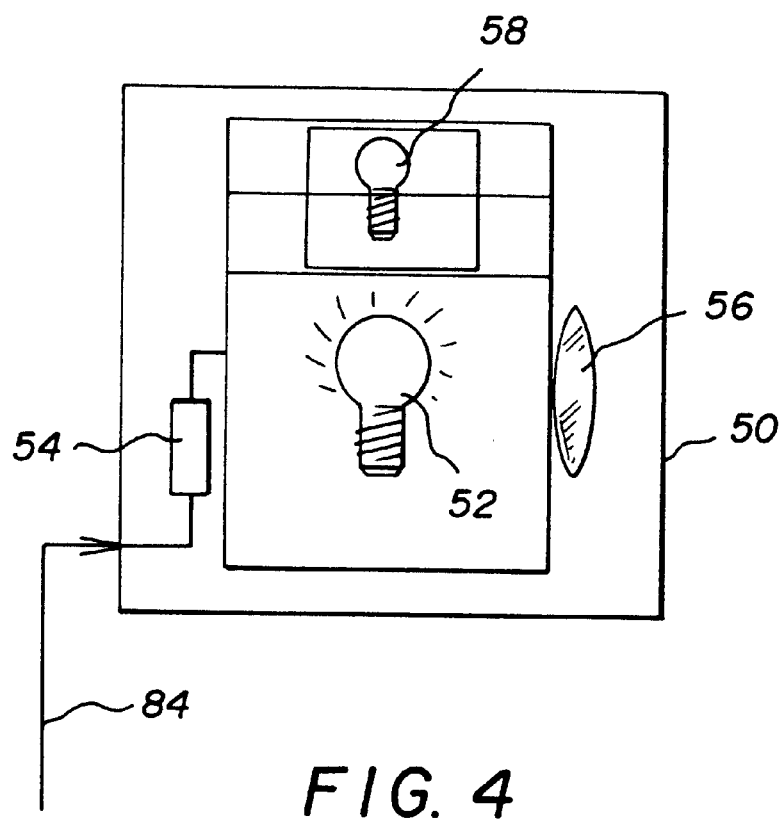
FIG. 4 is a diagram showing more detail of the illumination system shown in FIG. 1.

The illumination system 50 shown in FIG. 4 has the primary purpose of producing an amplitude-modulated illumination with its phase controllable for generating a shift in the transmitted wave pattern for each range image in the image bundle (although, as mentioned before, this function may be performed by modulation of the reflected illumination in the capture portion of the color scannerless range imaging system). The illumination system 50 includes a light source, which is preferably a laser light source 52 with an intensity of about 0.5 watt, and a modulation circuit 54 controllable through line 84 from the controller 80, for generating the requisite modulation signals of predetermined frequency with set of predetermined phase offsets. The laser light source 52 is preferably modulated at a modulation frequency of about 12.5 megahertz and the preferred phase offsets, as mentioned earlier are phase shifts θ in each range image given by $\theta_k=2\pi k/3$; k=0,1,2. The preferred wavelength of the laser light is about 830 nm, as this wavelength provides an optimal balance between concerns for eye-safety and for the typical response of the optical assembly 60 described below. Although the laser light need not necessarily be uniformly distributed, a diffusion lens 56 is positioned in front of the laser light source 52 in order to spread the modulated light across the desired field of view as uniformly as possible.

The illumination system 50 also includes a standard wide-band illumination system 58 that is not modulated. This illumination source is used for normal photographic images. This device 58 may be a commonly known and understood flash of a standard camera system, e.g., a commonly available electronic flash of the type useful with photographic cameras. The illumination system 50 is connected via the control line 84 to the controller 80, which directs the illumination system 50 to operate in either of the following modes: a) a first mode in which the laser is operated to illuminate the scene with a plurality (bundle) of exposures, each with a unique phase offset applied to its modulated frequency; and b) a second mode in which the standard wide-band illumination system 58 is turned on and the flash is initiated by the controller during capture of the color texture image. If ambient light is sufficient, of course, it may be unnecessary for the illumination system 50 to operate in the second mode in order to capture a color image; in that case, the image capture device would be instructed to operate without flash. Moreover, the sequence of image capture may be reversed, that is, the second mode may be engaged before the first mode or, indeed, the second mode might in specific situations be engaged between the several exposures of the first mode. The illumination system 50 also communicates with the controller 40 via the line 84 to indicate that all systems are ready for use.

Figure 5:
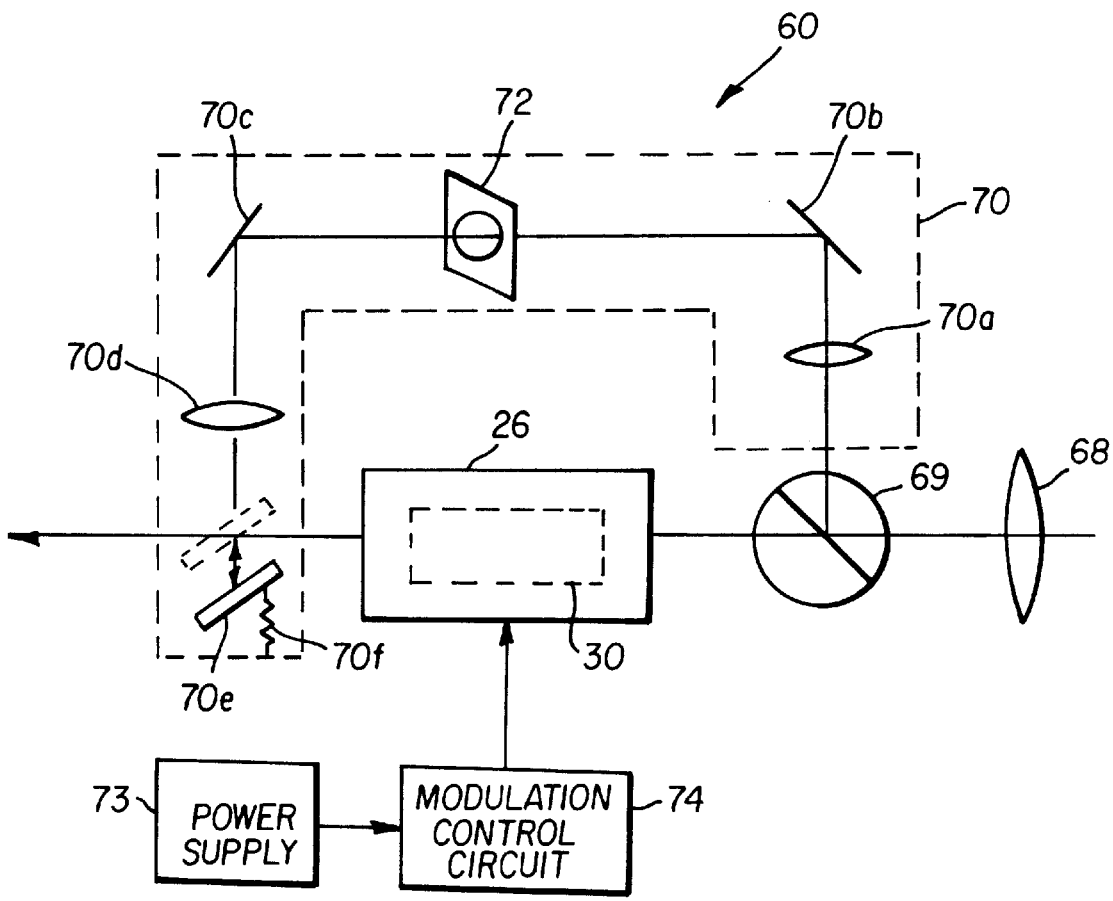
FIG. 5 is a diagram showing more detail of the optical assembly shown in FIG. 1.

Referring to FIG. 5, the optical assembly 60 contains components to enable both the range and texture capture, thereby imaging the bundle of phase interference patterns on the image capture element 42 as well as the color information. The optical assembly 60 includes a lens 68, a dichromatic mirror 69, an assembly 70 of mirrors and lenses, an image intensifier 26, a shutter 72, a power supply 73 and a modulation control circuit 74, which controls the modulation of the micro-channel plate 30 within the image intensifier 26 as well as managing the synchronization of the image intensifier 26 and the shutter 72. The lens 68 is a standard lens that establishes the primary optical path of the optical assembly 60 through the image intensifier 26; however, the lens 68 must not have an infrared filter, as this would greatly reduce the ability to ascertain range. The dichromatic mirror 69 splits the incoming light such that infrared light is permitted to pass through the mirror 69 along the primary optical path and visible light is reflected to an alternative, secondary optical path. The dichromatic mirror 69 is fixed in order that the two optical paths are properly routed.

The assembly 70, which directs the visible light around the micro-channel plate 71 and back to the image capture device 40, includes a collimating lens 70a, corner mirrors 70b and 70c, a lens 70d and a final, retractable mirror 70e. The collimating lens 70a is introduced immediately after the dichromatic mirror 69 to prevent the visible light from diverging. The corner mirrors 70b and 70c configure the light path to bypass the micro-channel plate 71 and return the deflected light toward the primary optical path, where it reflects off the final mirror 70e and rejoins the primary optical path. The final mirror 70e is enabled (by, e.g., a solenoid mechanism 70f) to be retracted when phase images of the image bundle are being collected and activated into the position shown in broken line when the texture image of the image bundle is being collected. After the final mirror 70e, the two optical paths share a common path to the image capture element 42. Prior to the retracting mirror 70e, the lens 70d is introduced to return the beam containing the visible light portion of the image to a focused state as required to obtain image registration with the phase images of the image bundle. A shutter 72 is closed during the period when the phase images of the image bundle are being collected. The shutter 72 is opened for the period when the texture image of the image bundle is being collected. The optical path for the infrared portion of the image signal is transmitted to the micro-channel plate 71. The micro-channel plate 71 converts the infrared light into visible light while also modulating the intensity response of the output.

Control of the modulation signal applied to the micro-channel plate 30 within the image intensifier 26 is accomplished by the modulation control circuit 74. The modulation control circuit 74 modulates the response of the micro-channel plate 30 with the same frequency signal as was applied to modulate the illumination device 50, and with a zero degree phase offset. The modulation control circuitry 74 also turns off the intensifier 26, introduces the mirror into the primary optical path, and opens the shutter 72 during the time when the texture image of the image bundle is being collected. In addition to these tasks, the modulation control circuitry 74 is also responsible for signaling the illumination device 50. The signals indicate the proper illuminator to use, and in the case of the laser portion of the illumination, the phase offset to be applied for the current phase image. As alluded to earlier, the modulation control circuit 74 in the optical assembly 60 may optionally produce amplitude-modulated illumination with its phase controllable for generating the before-mentioned shift (i.e., with preferred phase shifts, as mentioned earlier, given by $\theta_k=2\pi k/3$; k=0,1,2) in the transmitted wave pattern for each range image in the image bundle.

Figure 6:
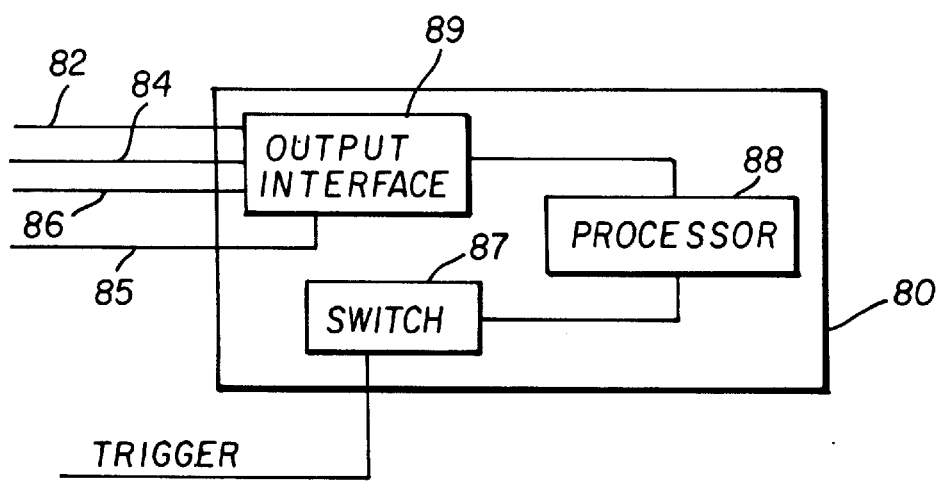
FIG. 6 is a diagram showing more detail of the controller shown in FIG. 1.

Referring to FIG. 6, the main purpose of the controller 80 is in sequencing and otherwise controlling the operation of the components of the color scannerless range imaging system to capture the image bundle 90 shown in FIG. 2. The controller 80 is shown to include a process 88, a switch 87 and an output interface 89. More particularly, the processor 88 determines the current state of image collection to complete an image bundle 90 and, if another image is needed, establishes the parameters for the next successive image in the image bundle. The processor 88 communicates via the interface 89 and the remote trigger line 82 with the image capture device 40 to activate the image capture element 42 and capture an image. This function is initiated by the switch 87 in the controller 80, which connects a user controlled trigger signal to the processor 88. The controller 80 also communicates via the interface 89 with the illumination system 50 through the control line 84. During all of this activity, the controller 80 maintains the capture status of the image bundle 90. If a range image 92 contained in the image bundle 90 is set to be captured, then the controller 80 signals the optical assembly 60 via the optics control line 86 to retract the mirror 70e and close the shutter 72; this enables images to be processed through the image intensifier 26 in the primary optical path. If the range images 92 in the bundle 90 are complete and a color texture image 94 is required, then the controller 80 signals the optical assembly 60 to position the retractable mirror 70e in the primary optical path and open the shutter 72; this enables images to bypass the micro-channel plate 71 on their way to the image capture device 50.

Figure 7:
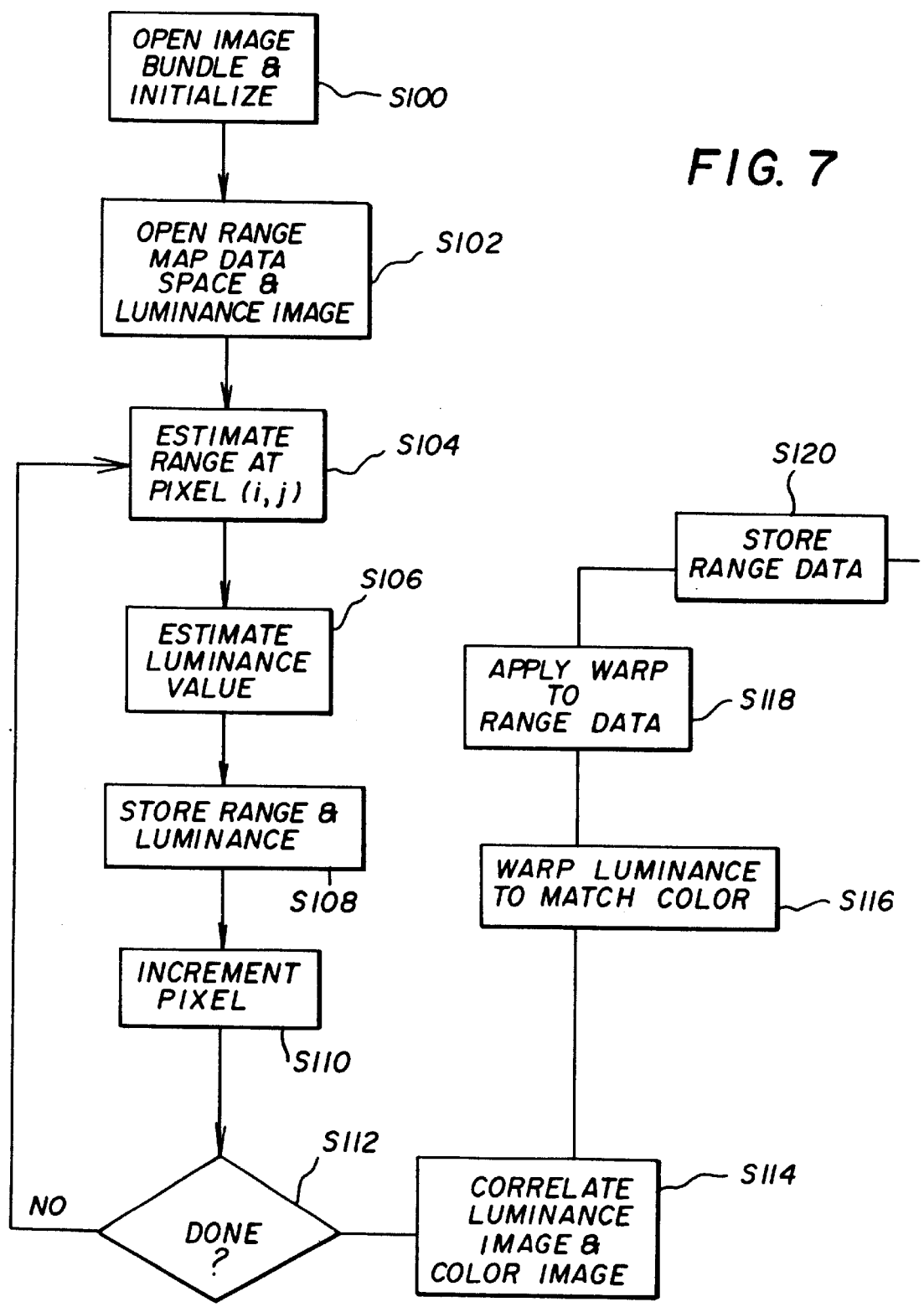
FIG. 7 is a diagram of the steps involved in processing image and range information in accordance with the invention.

The processing of the image bundle 90 is described in FIG. 7. The range images 92 of the bundle 90 and the color texture image 94 are combined to form a color image with a dense set of range values, that is, where range values are associated with a preponderance of, or all, image pixel locations. The range images 92 contained in the image bundle 90 are used to determine the range estimates for each pixel in the image. The process begins with the opening of the image bundle (S100), and the initializing internal parameters, including the number of range images, the number of pixels to be processed and the modulation frequency of the camera system. A processing loop is then entered that operates on the image in a pixel-wise fashion. After the range map is opened (S102), the first step is to estimate the range (S104) for the (i,j)th pixels. For each pixel location (i,j), the range is estimated by sampling each range image at its (k,j)th pixels location and performing the aforementioned calculation. The pixel intensity values and the phase offset used in producing the image in the image bundle are matched. The aforementioned equations (1)–(9) describe a method of estimating range using an image bundle with at least three images corresponding to distinct phase offsets of the intensifier and/or laser. Moreover, it is well known that there is a sinusoidal relationship between the intensity values and the phase offset. By fitting a sine-wave of the form $\alpha+\beta \sin(\phi+\omega)$ to the data, the range can be estimated. As a by-product of this estimate, an estimate of the luminance value (S106) of the pixel is obtained. By performing these operations the estimated luminance value and the estimated range at the $(i,j)^{th}$ pixel is obtained and stored (S108). The pixel location is incremented (S110) and if all pixels are processed (S112) then the loop is exited. Otherwise, the next pixel is processed in the same manner.

A full color image 94 is acquired when the secondary optical path in the optical element 60 is enabled. The luminance image estimated above and the color image needs to be correlated (S114). There are many approaches to accomplish this task, e.g., refer to *The Image Processing Handbook*, $2^{nd}$ ed., by John C. Russ, CRC Press, 1995, pp. 332–336. These two images are then correlated (S114) in order to eliminate any distortions caused by subtle differences in the physical optics of the two paths comprising the optical assembly 60. A warping of the luminance image (S116) to match the features of the luminance image is obtained. The warping is applied to the range data (S118) in order to match the range data with the color image features. Such warping techniques are described in *Digital Image Warping*, by G. Wolbert, *IEEE Computer Society Press*, 1990. The warped range image and the color image are combined and stored as a color image with range data (S120). It is preferred that the range data be stored as floating point values.

Figure 9:
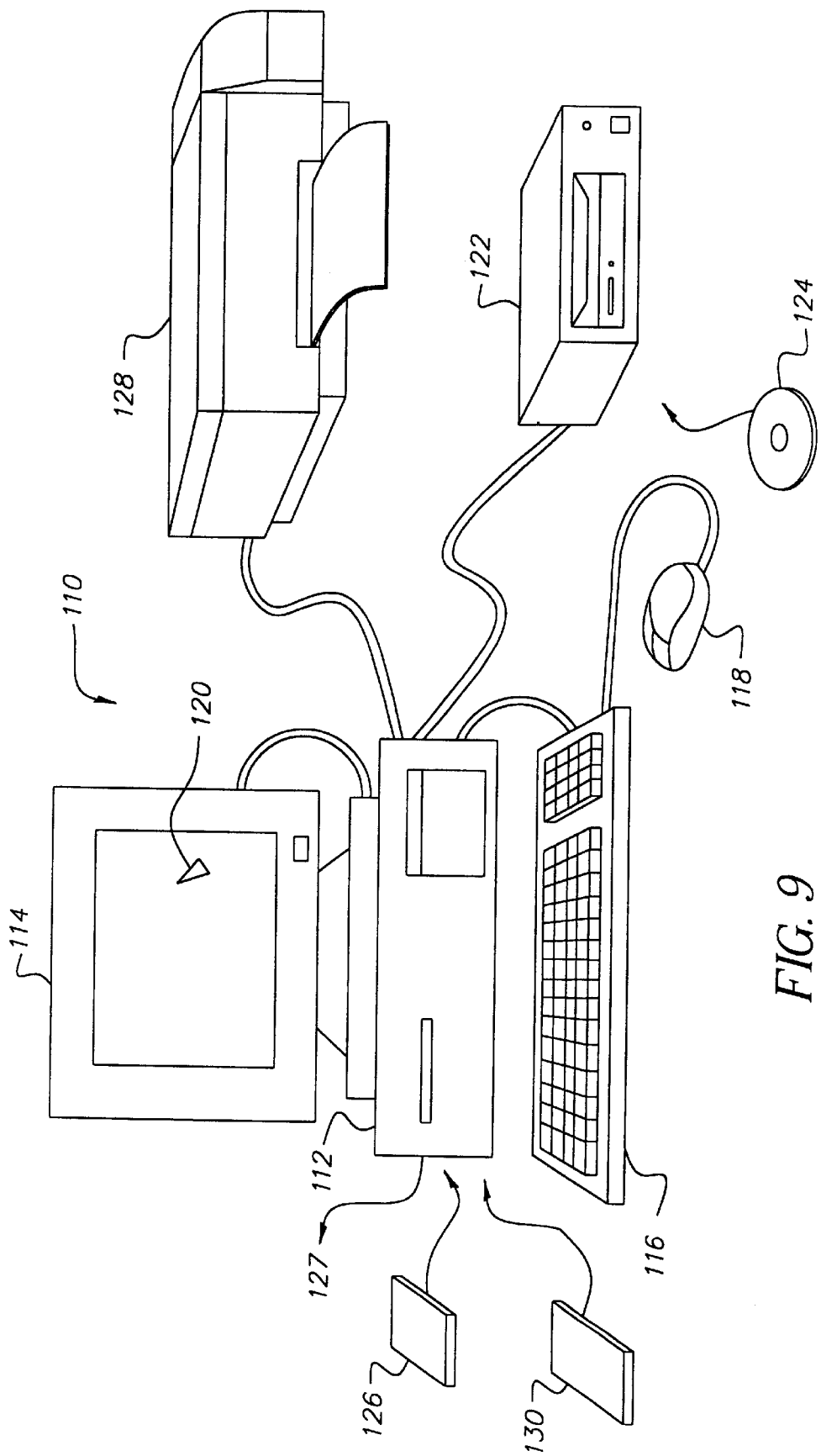
FIG. 9 is a perspective diagram of a computer system for implementing certain programs associated with the present invention.

The aforementioned processing of the image bundles 90 is preferably performed on any well-known computer system, such as the computer system shown in FIG. 9. It is also instructive to note that the images may be either directly input into the computer system from the color scannerless range imaging system (particularly if it is a digital capture system) or digitized before input into the computer system (for example by scanning an original, such as a silver halide film, if the imaging system is a film system). Referring to FIG. 9, there is illustrated a computer system 110 for implementing the programs associated with the present invention. Although the computer system 110 is shown for the purpose of illustrating a preferred embodiment, the present invention is not limited to the computer system 110 shown, but may be sued on any electronic processing system. The computer system 110 includes a microprocessor-based unit 112 for receiving and processing software programs of the type illustrated in FIG. 7 and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software program and for providing a mans of inputting the software programs and other information to the microprocessor based unit 112 via a compact disk 124, which typically includes a software program. In addition, a floppy disk 126 may also include a software program, and is inserted into the microprocessor-based unit 112 for inputting he software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 is connected to the microprocessor-based unit 112 for printing a hardcopy of the output of the computer system 110.

Images can also be displayed on the display 114 via a personal computer card (PC card) 130, such as, as it was formerly known, a PCMCIA card (based on the specifications of the Personal Computer Memory card International Association) which contains digitized images from the color scannerless range imaging system electronically embodied in the card 130. The PC card 130 is ultimately inserted into the microprocessor based unit 112 for permitting visual display of the image on the display 114. Images may also be input via the compact disk 124, the floppy disk 126, or the networked connection 127. After the images have been processed in accordance with the steps shown in FIG. 7, the range data is stored together with color values, such as RGB data, for each image pixel. Such stored data may be accumulated for the entire image and written as a dense range map including color data onto the compact disk 124, the floppy disk 126, or the card 130, or communicated via the network connection 127.

These and other aspects, object, features and advantages of the present invention will be more clearly understood and appreciated from a review of the following detail description of the preferred embodiments and appended claims, and by reference to the accompanying drawings.

| PARTS LIST | |
|---|---|
| 10 | range imaging system |
| 12 | scene |
| 14 | illuminator |
| 16 | modulator |
| 18 | output beam |
| 20 | reflected beam |
| 22 | receiving section |
| 24 | photocathode |
| 26 | image intensifier |
| 30 | microchannel plate |
| 32 | phosphor screen |
| 34 | capture mechanism |
| 36 | range processor |
| 40 | image capture device |
| 42 | image capture element |
| 44 | film |
| 46 | digital storage mechanism |
| 48 | camera controller |
| 50 | illumination device |
| 52 | laser source |
| 54 | modulation circuit |
| 56 | diffusion lens |
| 58 | standard illumination source |
| 60 | optical assembly |
| 62 | beam separator |
| 64 | modulating element |
| 66 | optical subassembly |
| 68 | lens |
| 69 | dichromatic mirror |
| 70 | assembly of mirrors and lenses |
| 70a | collimating lens |
| 70b | mirror |
| 70c | mirror |
| 70d | lens |
| 70e | retractable mirror |
| 70f | solenoid mechanism |
| 72 | shutter |
| 73 | power supply |
| 74 | modulation control circuit |
| 80 | controller |
| 82 | remote trigger |
| 84 | illumination control |
| 86 | optics control |
| 87 | switch |
| 88 | processor |
| 89 | output interface |
| 90 | image bundle |
| 92 | range images |
| 94 | color image |
| 96 | common information |
| 110 | computer system |
| 112 | microprocessor-based unit |
| 114 | display |
| 116 | keyboard |
| 118 | mouse |
| 120 | selector |
| 122 | CD-ROM |
| 124 | CD |
| 126 | floppy disk |
| 127 | network connection |
| 128 | printer |
| 130 | PC card |

What is claimed is:

1. A color scannerless range imaging system for capturing both color and range information from a scene, said system comprising:

(a) an illumination system for controllably illuminating the scene with modulated illumination, whereby some of the modulated illumination is reflected from objects in the scene;

(b) an image responsive element for capturing image light from the scene, including the modulated image light;

(c) one or more optical elements establishing a primary optical path for directing image light toward the image responsive element;

(d) a beamsplitter located in the primary optical path for separating the image light into two channels, a first channel including an infrared component and a second channel including a color texture component, at least one of said channels traversing a secondary optical path distinct form the primary path;

(e) a modulating element operative in the first channel to modulate the infrared component with a modulating signal, thereby generating a processed infrared component with phase data indicative of range information; and (f) an optical network in the secondary optical path for recombining the secondary optical path into the primary optical path such that the processed infrared component and the color texture component are directed to the image responsive element.

2. The range imaging system as claimed in claim 1 further comprising means for alternately activating the channels to alternately provide the processed infrared component and the color texture component to the image responsive element.

3. The range imaging system as claimed in claim 2 wherein the color texture component is channeled through the secondary optical path and a shutter placed in the secondary path for controlling the passage of the color texture component.

4. The range imaging system as claimed in claim 1 wherein the modulating element is a micro-channel plate.

5. The range imaging system as claimed in claim 1 wherein the optical network comprises a mirror network for recombining the secondary optical path into the primary optical path such that the processed infrared component and the color texture component are directed to the image responsive element.

6. The range imaging system as claimed in claim 1 wherein the beamsplitter is a dichromatic beamsplitter.

7. The range imaging system as claimed in claim 2 wherein the means for alternately activating the channels is coupled to a shutter release in order to initiate an image capture of both color and range information with a single engagement of the shutter release.

8. The range imaging system as claimed in claim 1 wherein the elements (c) through (f) are included in an optical attachment that is mountable upon a conventional camera body.

9. The range imaging system as claimed in claim 1 wherein the infrared component includes a modulation component having the same modulating frequency as the modulating signal applied to the illumination system.

10. The range imaging system as claimed in claim 1 further comprising means for storing the color and range information as a bundle of associated images.

11. The range imaging system as claimed in claim 1 wherein the image responsive element captures a plurality of images of the reflected modulated illumination, wherein each image incorporates the effect of a predetermined modulation frequency together with a phase offset unique for each image.

12. The range imaging system as claimed in claim 11 wherein each unique phase offset $\theta$ is given by $\theta_i = 2\pi i/3$; $i=0,1,2$.

13. The range imaging system as claimed in claim 1 wherein the image responsive element is a photographic film.

14. The range imaging system as claimed in claim 1 wherein the image responsive element is a digital image sensor.

15. The range imaging system as claimed in claim 1 wherein the illumination system includes a laser illuminator for producing the modulated illumination.

16. A color scannerless range imaging system for capturing both color and range information from a scene, said system comprising:

(a) an illumination system for controllably illuminating the scene with modulated illumination, whereby some of the modulated illumination is reflected from objects in the scene;

(b) an image responsive element for capturing image light from the scene, including the modulated image light;

(c) one or more optical elements establishing a primary optical path for directing image light toward the image responsive element;

(d) means located in the primary optical path for separating the image light an infrared component and a color texture component, wherein the color texture component traverses a secondary optical path distinct from the primary optical path;

(e) a modulating element operative to modulate the infrared component with a modulating signal, thereby generating a processed infrared component with phase data indicative of range information;

(f) one or more optical control elements placed in the secondary path of the color texture component for controlling the passage of the color texture component and its recombination with the primary optical path; and (g) means for alternately activating the modulating element and the one or more optical control elements to alternately provide the processed infrared component and the color texture component to the image responsive element.

17. The range imaging system as claimed in claim 16 wherein the one or more optical control elements includes a shutter placed in the secondary path for controlling the passage of the color texture component.

18. The range imaging system as claimed in claim 16 wherein the one or more optical control elements include a mirror network for recombining the secondary optical path into the primary optical path such that the processed infrared component and the color texture component are directed to the image responsive element.

19. The range imaging system as claimed in claim 16 wherein the modulating element is a micro-channel plate.

20. The range imaging system as claimed in claim 16 wherein the means located in the primary optical path for separating the image light comprises a dichromatic beamsplitter.

21. The range imaging system as claimed in claim 16 wherein the means for alternately activating the modulating element and the one or more optical control elements is coupled to a shutter release in order to initiate an image capture of both color and range information with a single engagement of the shutter release.

22. The range imaging system as claimed in claim 16 wherein the elements (c) through (f) are included in an optical attachment that is mountable to a conventional camera body.

23. The range imaging system as claimed in claim 16 wherein the infrared component includes a modulation component having the same modulating frequency as the modulating signal applied to the illumination system.

24. A method for capturing both color and range information from a scene on an image responsive element, said system comprising the steps of:

(a) controllably illuminating the scene with modulated illumination, whereby some of the modulated illumination is reflected from objects in the scene;

(b) capturing image light from the scene, including the modulated image light;

(c) establishing a primary optical path for directing image light toward the image responsive element;

(d) separating the image light into two channels, a first channel including an infrared component and a second channel including a color texture component, at least one of said channels traversing a secondary optical path distinct from the primary path;

(e) applying a modulating signal to the infrared component in the first channel and generating a processed infrared component with phase data indicative of range information; and (f) recombining the secondary optical path into the primary optical path such that the processed infrared component and the color texture component are directed through the primary optical path to the image responsive element.

25. The method as claimed in claim 24 further comprising the step of alternately activating the channels to alternately provide the processed infrared component and the color texture component to the image responsive element.

26. The method as claimed in claim 25 wherein the color texture component is channeled through the secondary optical path and the method further includes the step of shuttering the secondary path in order to control the passage of the color texture component.

27. The method as claimed in claim 24 further comprising the step of storing the color and range information as a bundle of associated images.

28. The method as claimed in claim 27 further including the step of capturing a plurality of images of the reflected modulated illumination, wherein each image incorporates the effect of a predetermined modulation frequency together with a phase offset unique for each image.

29. The method as claimed in claim 28 wherein each unique phase offset $\theta$ is given by $\theta_i = 2\pi i/3$; $i=0,1,2$.

* * * * *